US00RE44505E

(19) United States
(12) Reissued Patent
Sieredzinski

(10) Patent Number: US RE44,505 E
(45) Date of Reissued Patent: Sep. 24, 2013

(54) ASSEMBLY FOR PERFORATING ROD-SHAPED ELEMENTS, PARTICULARLY CIGARETTES

(75) Inventor: Marek Edward Sieredzinski, Radom (PL)

(73) Assignee: International Tobacco Machinery SP. Z.O.O., Radom (PL)

(21) Appl. No.: 13/385,885

(22) Filed: Mar. 12, 2012

Related U.S. Patent Documents

Reissue of:
(64) Patent No.: 8,056,567
Issued: Nov. 15, 2011
Appl. No.: 12/351,029
Filed: Jan. 9, 2009

(30) Foreign Application Priority Data

Jan. 11, 2008 (PL) ..... P384242

(51) Int. Cl.
*A24C 1/04* (2006.01)

(52) U.S. Cl.
USPC ..... 131/96; 83/876; 83/664

(58) Field of Classification Search
USPC ..... 131/96, 907; 83/872, 873, 876, 83/878, 664
See application file for complete search history.

(56) References Cited

U.S. PATENT DOCUMENTS

| | | | |
|---|---|---|---|
| 2,002,142 | A | 5/1935 | Gibson et al. |
| 3,382,874 | A | 5/1968 | Pinkham |
| 2008/0115647 | A1 | 5/2008 | Wang |

FOREIGN PATENT DOCUMENTS

| | | |
|---|---|---|
| CA | 2125911 | 12/1994 |
| DE | 3839431 | 5/1990 |
| DE | 38339431 | 5/1990 |
| DE | 4119873 | 12/1992 |
| DE | 4446323 | 6/1996 |
| GB | 1262664 | 2/1972 |
| PL | 174406 | 6/1994 |
| PL | 174406 B1 | 6/1994 |

OTHER PUBLICATIONS

Report on prior art for PL 174406 dated Jan. 11, 2008.
Second Chinese Office Action for Application No. 200910007274.2 dated Aug. 2, 2012.

*Primary Examiner* — Richard Crispino
*Assistant Examiner* — Dionne Walls Mayes
(74) *Attorney, Agent, or Firm* — Marshall, Gerstein & Borun LLP

(57) ABSTRACT

Assembly for perforating rod-shaped elements, particularly cigarettes, which comprises a driving shaft along which a number of rotary perforating cutters are arranged and the cutters are separated by distance rings, wherein each rotary cutter is positioned between two pushing elements and it protrudes from between those pushing elements.

4 Claims, 2 Drawing Sheets

ASSEMBLY FOR PERFORATING ROD-SHAPED ELEMENTS, PARTICULARLY CIGARETTES

Matter enclosed in heavy brackets [ ] appears in the original patent but forms no part of this reissue specification; matter printed in italics indicates the additions made by reissue.

CROSS-REFERENCE TO RELATED APPLICATION

The present application claims the benefit of priority of Polish Patent Application No. P 384242, filed Jan. 11, 2008. The entire text of the priority application is incorporated herein by reference in its entirety.

FIELD OF THE DISCLOSURE

The disclosure concerns an assembly for perforating rod-shaped elements, particularly cigarettes, used in particular in an apparatus for recovery of tobacco from damaged or substandard cigarettes, rejected in the production process.

BACKGROUND

In the process of cigarette manufacture, many cigarettes become damaged or the quality of either cigarette paper wrapper or tipping paper does not pass minimum standards to qualify for consumer use. In such cases tobacco in the above-mentioned cigarettes, which is a valuable raw material, needs to be recovered.

Description DE 4119873 presents a construction of an apparatus for tearing the cigarette paper wrapper of the substandard filter cigarettes. The above-mentioned device consists of a belt conveyor to transport parallel spaced cigarettes, and of at least one drum used to "open" paper wrappers by means of rotary cutters having tiny teeth located around their perimeter, and those teeth do not damage the cigarette filter tipping paper. Power transmission of the drum is synchronized with the power transmission of the belt conveyor.

Description DE 4446323 discloses an apparatus for recovering tobacco from damaged cigarettes, wherein, behind the conveyor of cigarettes onto which cigarettes are sequentially placed, a cutting device and a sieve for sifting recovered tobacco from the fragments of cut cigarette paper wrapper are used.

Device in accordance with GB 1262664, which is used to "open" rejected cigarettes, has a conveyor and a roller with V-shaped circumferential grooves, the roller being coupled with the conveyor. The grooves have appropriate dimensions so that cigarettes fed lengthwise are clamped between opposite surfaces of the roller's grooves and the conveyor. In this manner the cigarette paper wrapper is ripped and "open" cigarettes are moved to the beating engine, where paper wrapper, tobacco and filter tips are separated.

In one of the constructions of an apparatus for recovery of tobacco from substandard cigarettes which is known from the prior art, the conveyor belt feeds the cigarettes onto the linear vibratory conveyor which moves them towards multiple groove drum conveyor, which transports the cigarettes to the subsequent stations of the apparatus. Cigarettes on the linear vibratory conveyor are moved axially along the direction of movement and are pushed onto the groove drum conveyor, tangentially to its circumference. A rotary cutter with numerous short blades arranged circumferentially is placed over each groove of the drum conveyor. Rotary cutters and drum conveyor rotate, which causes the paper wrapper of the cigarettes in the grooves of the drum conveyor to perforate, whereas, due to precise adjustment of the distance between the cutter blade and the groove surface of the groove conveyor, the cigarette tipping paper is not perforated. The cigarettes processed so move along the drum conveyor and fall on to the vibratory conveyor from where they are moved on to the next station of the process where tobacco is separated from the paper wrapper.

In the known construction of a cigarette perforating assembly, the rotary cutters prick the cigarette, thus perforating its paper wrapper. Some cigarettes get caught against the blades of the rotary cutters, though, and are lifted from the surface of the drum conveyor or linear conveyor and pulled under the clearing shaft, where they tend to fray. Occasionally, some cigarettes lifted from the surface of the conveyor travel over the cutter and once more enter the space between the blades and the groove surface of the drum conveyor. In this situation cigarettes can be perforated again, e.g. when a cigarette is positioned a different way during each cycle of perforation, or when two cigarettes are simultaneously pulled under one cutter.

As a result of issues described above known from the prior art, the mass of tobacco recovered from cigarettes becomes contaminated with small fragments of cigarette paper wrapper, which is a serious shortcoming of the apparatus for recovering tobacco from cigarettes.

SUMMARY OF THE DISCLOSURE

One aspect of the disclosure is an assembly for perforating rod-shaped elements, particularly cigarettes, and said assembly comprises a driving shaft, along which a number of rotary perforating cutters are arranged and said cutters are separated by distance rings.

Another aspect of the disclosure is locating each rotary cutter between two pushing elements and positioning said cutter so that it protrudes from between said pushing elements.

Advantageously, the pushing elements are fixed or rotary and take, in particular, a form of cleaning rings with an off-center shift and the rings are loosely arranged on the distance rings, and the distance rings are mounted on the driving shaft and the off-center shift of the cleaning rings is directed either perpendicularly to the direction of the movement of cigarettes or along that direction.

Tangential velocities of the circumference of the rotational pushing elements, i.e. contact surfaces, are synchronized with, or close to tangential velocity of the drum conveyor or to the speed of the linear conveyor and the perforating cutter.

The advantage of the construction according to the disclosure is that the application of pushing elements of a simple design makes it possible to push the cigarettes off the peripheral surfaces of the rotary cutters on which said cigarettes have been caught and thus it provides efficient cleaning of the cutters.

In case of using rotational pushing elements, synchronizing the tangential velocity of their circumference, i.e. contact surface, with the velocity of the drum carrier and rotary cutter facilitates pushing off the cigarettes hitched by the perforating cutter.

When the pushing element is fixed, the movement of the cigarette being perforated is braked, which elongates time needed to perforate the cigarette, and the result is a longer incision in cigarette paper wrapper.

BRIEF DESCRIPTION OF THE DRAWINGS

The subject of the disclosure is presented in exemplary embodiments in the drawing, where.

DETAILED DESCRIPTION

Figure 1B:
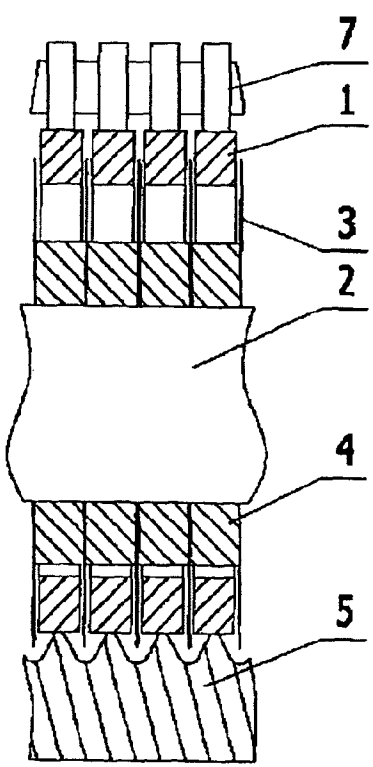
FIG. 1B is a section of the assembly according to FIG. 1A, in the cross-sectional view, over the plane parallel to the axis of the driving shaft.
Figure 1A:
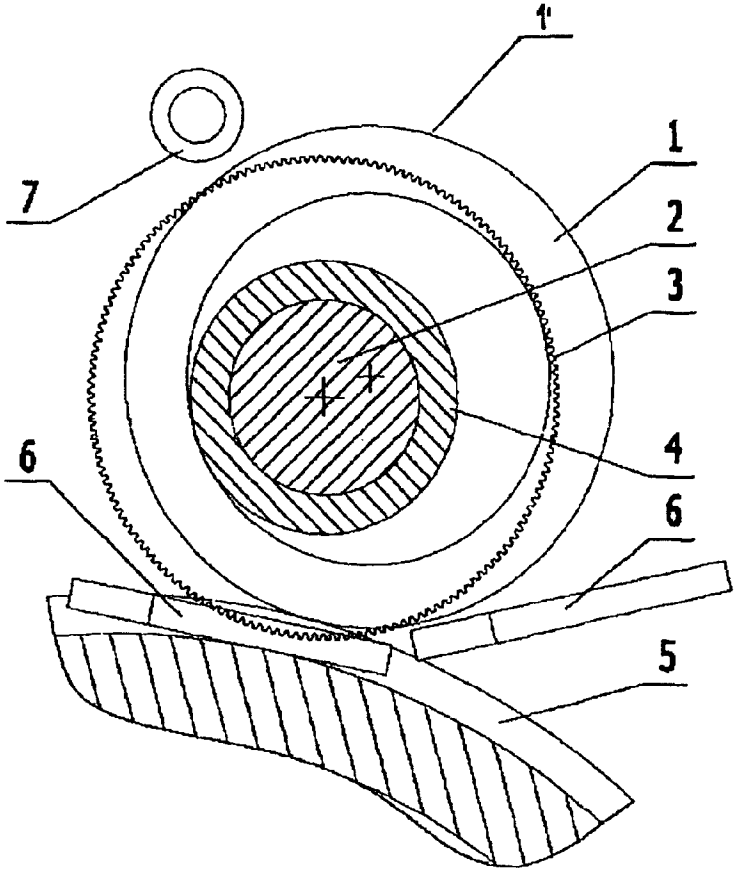
FIG. 1A shows a section of the assembly according to the disclosure in the cross-sectional view over the plane positioned perpendicularly to the axis of the driving shaft, and where the cleaning ring is shifted off-center in the direction of the movement of cigarettes.
Figure 2:
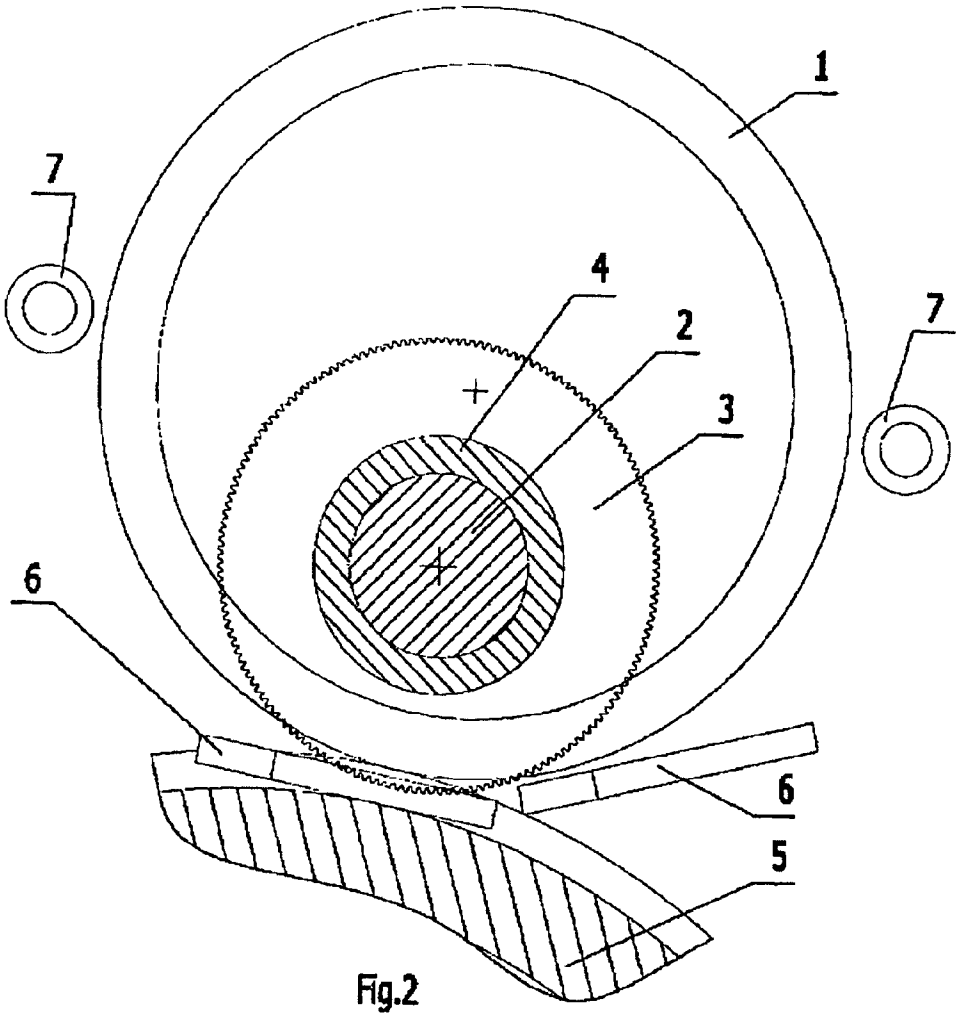
FIG. 2 is a section of the assembly as per the disclosure, in the cross-sectional view, over the plane positioned perpendicularly to the axis of the driving shaft, whereas the cleaning ring is shifted off center and perpendicularly to the direction of the movement of cigarettes.

As shown in FIGS. 1A and 1B, the assembly for perforating cigarettes comprises a driving shaft 2 and a groove drum conveyor 5 located below the driving shaft. Along the length of the driving shaft 2, a series of rotary cutters 3 are arranged and said cutters have numerous short blades around their circumference, which are separated by the distance rings 4 fixed to the shaft 2. The blades of the rotary cutters 3 are set within the grooves of the groove conveyor 5 and cigarettes 6 subject to perforation are moved along said grooves. Cleaning rings 1 with circumferential contact surface 1' are loosely arranged and off-centrally movable, on the distance rings 4 between the rotary cutters 3. The off-center movement of the ring 1 can be directed, essentially along the direction of the movement of cigarettes and is shown in FIG. 1A, or it can be directed perpendicularly to the direction of the movement, as shown in FIG. 2. A directional shaft 7 is located in the upper section of the assembly.

The loose cleaning ring 1 leans against the drum conveyor 5 and the ring 4 and is frictionally driven by those elements and slides of the cleaning ring 1 against the drum conveyor 5 and the distance ring 4 are admissible. The size of the cleaning ring 1 allows for free perpendicular movements over a vertical plane. The limit to those movements of the cleaning ring 1 is imposed by the surface of the drum conveyor 5 and the directional shaft 7 from the outside and by the distance ring 4 from the inside. Positioning of all those elements ensures that the cleaning ring 1 is always in the off-center position against the driving shaft 2 and the distance ring 4. Due to the direction of the off-center movement of the cleaning ring 1, shown in the figures of the drawing, the contact surfaces 1' of the cleaning rings 1 push off a cigarette 6 caught by the perforating rotary cutter 3.

I claim:

1. Assembly for perforating rod-shaped elements, comprising a driving shaft provided with a number of rotary perforating cutters arranged along the shaft and separated by distance rings, the assembly further comprising a groove drum conveyor located below the driving shaft, each rotary cutter being positioned between two pushing elements and protruding from between the pushing elements wherein the pushing elements comprise cleaning rings, which are loosely arranged and off-centrally movable on the distance rings, the distance rings being fixed to the driving shaft.

2. Assembly according to claim 1, wherein the off-center movement of the cleaning rings is directed perpendicularly to the direction of the movement of the rod-shaped elements.

3. Assembly according to claim 1, wherein the off-center movement of the cleaning rings is substantially parallel to the movement of the rod-shaped elements.

4. Assembly according to claim 1, wherein the rod-shaped elements are cigarettes.

* * * * *